(No Model.)
T. H. ALDRICH.
SECONDARY BATTERY.
No. 451,445. Patented May 5, 1891.
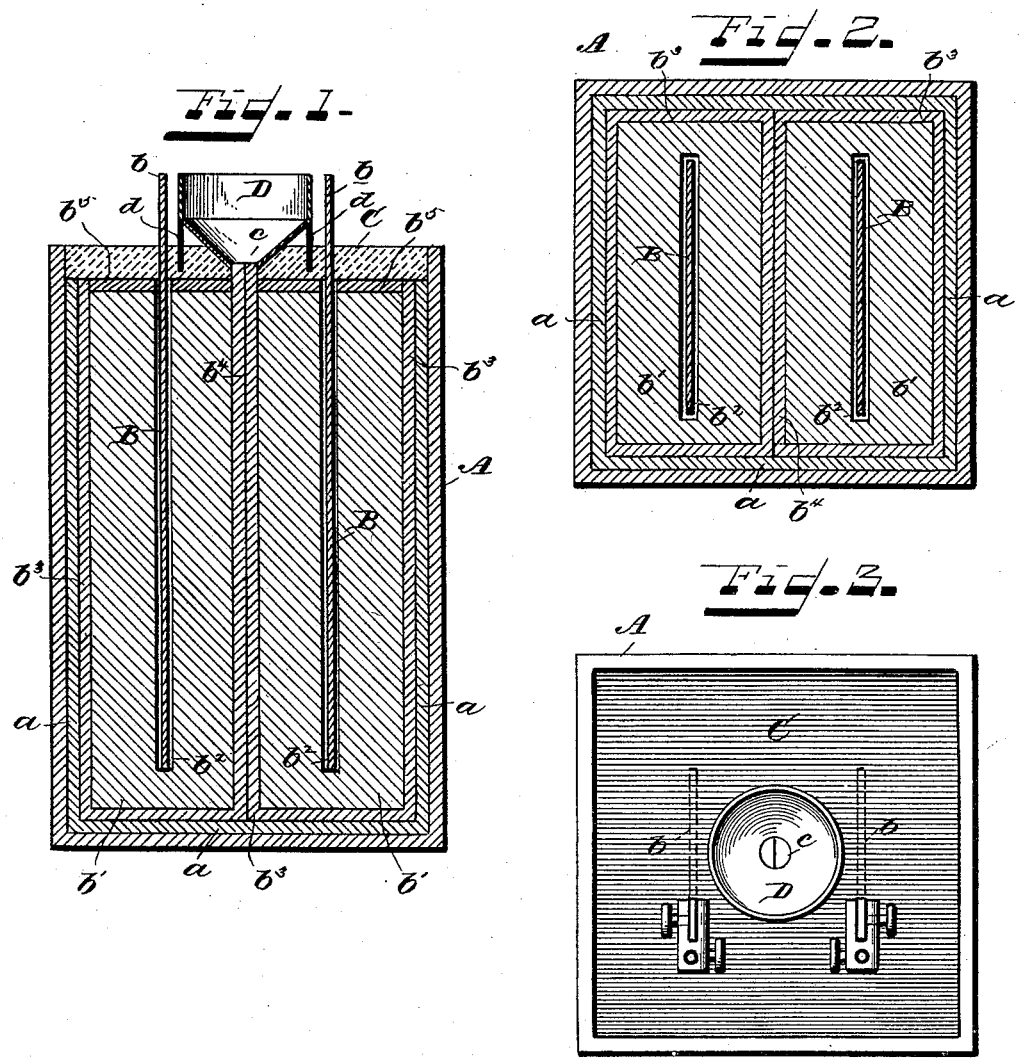
Witnesses.
James N. Causey
August F. Herbslet
Inventor.
Truman H. Aldrich

UNITED STATES PATENT OFFICE.

TRUMAN H. ALDRICH, OF CINCINNATI, OHIO.

SECONDARY BATTERY.

SPECIFICATION forming part of Letters Patent No. 451,445, dated May 5, 1891.

Application filed December 27, 1890. Serial No. 375,933. (No model.)

*To all whom it may concern:*

Be it known that I, TRUMAN H. ALDRICH, a citizen of the United States, residing at Cincinnati, in the county of Hamilton and State of Ohio, have invented a certain new and useful Improvement in Secondary Batteries, of which the following is a specification.

Within certain limits the larger the amount of active material surrounding a conducting-plate in a secondary battery the greater the storage capacity. In batteries as heretofore constructed such active material has been subject to cracking and peeling caused by the expansion of the plate and by the formation of active material about it by electrolytic action.

The object of my invention is to provide a storage-battery in which a comparatively large amount of active material may be used and in which the danger of cracking or peeling is avoided; and the invention consists in the construction hereinafter described and claimed. The weight of active material is considerably less than that of the conducting-plate, and a battery having a large storage capacity in proportion to its weight is secured by surrounding the conducting-plate with a comparatively large body of active material. I guard against the cracking and peeling of the active material incident to batteries as heretofore constructed by providing a space between the conducting-plate and the active material, allowing room for the expansion of the plate and the formation of active material due to electrolytic action. This space is preferably sufficiently large to permit such expansion and formation of active material by electrolytic action, but not large enough to permit the chemical equivalents of electricity to rise in bubbles to the surface. The body of active material surrounding the plate may be composed of any suitable substance. I find the best results are obtained by casting the active material in a mold around a suitable core or former, preferably of slightly-larger dimensions than the plate, removing the core after the material has become sufficiently hard to retain its shape, and inserting the plate in its stead. It may also be formed by casting the active material in the shape of a block, and then drilling apertures therein of suitable size to receive the plates.

In the drawings, Figure 1 is a vertical cross-section of my improved battery. Fig. 2 is a longitudinal section of the same, and Fig. 3 a top plan view of the same.

A represents a jar of the battery; B B, electrodes constituting a cell of the same, consisting of a conducting-plate $b$, surrounded by a body of active material $b'$. I provide a space $b^2$ between the conducting-plate and active material, preferably one-sixteenth of an inch, or thereabout, adapted to permit expansion of the conducting-plate. This space will also permit expansion of the active material. To further permit expansion of the electrodes and to insure their being held snugly in place in the battery, I surround them in whole or in part with a covering $b^3$ of porous or perforated compressible and preferably absorbent and non-conducting substance, such as asbestos or similar material. The covering on the inner sides of the electrodes also serves as a porous partition $b^4$ between the same, and preferably extends slightly above the body of active material of the electrode. I prefer also to line the inside of the jar with a lining $a$ of substance similar to that covering the electrodes. The top of the electrodes may also be provided with a layer $b^5$ of asbestos or similar material. C is a cover adapted to seal the battery, consisting of non-porous non-conducting material—such as sealing-wax—having the terminals of the electrodes taking therethrough and preferably forming an intimate union at its edge with the jar. This cover is provided with an aperture $c$, communicating preferably with the porous partition, through which the electrolyte may be supplied. This aperture preferably affords the only escape for the salts formed. D is a cup or guard taking over the aperture and adapted to retain the salts passing through the aperture and prevent their communicating with either pole of the battery. Suitable supports $d$, preferably taking into the cover, retain the cup in position.

I claim—

1. In an electrode for secondary batteries, a body of active material formed with an aperture adapted to receive a conducting-plate, and a conducting-plate taking loosely into the same, substantially as and for the purpose specified.

2. In an electrode for secondary batteries, a body of active material, a conducting-plate, and a space between the body of active material and the conducting-plate, adapted to permit expansion of the electrode, substantially as and for the purpose specified.

3. In a secondary battery, a jar, electrodes taking into the jar and consisting of a body of active material provided with an aperture, a conducting-plate taking into the aperture, and a space between the conducting-plate and the body of active material, in combination with a body of porous or perforated and compressible substance partially or wholly surrounding the electrodes and adapted to permit their expansion, substantially as and for the purpose specified.

4. The combination, in a secondary battery, of a jar, a lining for the jar, consisting of porous or perforated and compressible substance, electrodes taking into the jar against the lining, a porous partition between the electrodes, the latter being adapted to fit snugly in the jar and permitted to expand during the charging and discharging of the battery, a body of porous or perforated and compressible substance adapted to take over the electrodes, a cover adapted to seal the battery, and an aperture through which the electrolyte may be supplied to the battery, substantially as and for the purpose specified.

5. The combination, in a secondary battery, of the jar A, the electrodes B B, each consisting of the conducting-plate $b$, surrounded by a body of active material $b'$ and provided with a space $b^2$ between the conducting-plate and the active material, the covering $b^3$ for the electrodes, the partition $b^4$, the lining $a$, the layer $b^5$, the cover C, the aperture $c$, and the cup D, substantially as and for the purpose specified.

TRUMAN H. ALDRICH.

Witnesses:
JAMES N. RAMSEY,
AUGUST F. HERBSLEB.